United States Patent [19]

Rinker

[11] Patent Number: 4,978,494

[45] Date of Patent: Dec. 18, 1990

[54] HYDRAULIC LOCK FOR DISPLACER ROD DRIVE MECHANISM (DRDM) AND METHOD OF OPERATION

[75] Inventor: Eric D. Rinker, Penn Township, Westmoreland County, Pa.

[73] Assignee: Westinghouse Electric Corp., Pittsburgh, Pa.

[21] Appl. No.: 176,575

[22] Filed: Apr. 1, 1988

[51] Int. Cl.$^5$ .............................................. G21C 7/06
[52] U.S. Cl. ................................. 376/235; 376/230; 376/231
[58] Field of Search .................... 376/230, 231, 235

[56] References Cited

U.S. PATENT DOCUMENTS

| | | | |
|---|---|---|---|
| 2,751,229 | 6/1956 | Schultz | 279/75 |
| 3,020,887 | 2/1962 | Hobson et al. | 121/40 |
| 3,154,472 | 10/1964 | Shannon | 176/36 |
| 3,321,372 | 5/1967 | Challender | 176/36 |
| 3,364,120 | 1/1968 | Winders et al. | 176/36 |
| 3,779,134 | 12/1973 | Daublebsky et al. | 91/44 |
| 3,852,153 | 12/1974 | Maslenok et al. | 176/36 |
| 3,855,059 | 12/1974 | Groves et al. | 176/36 R |
| 3,941,653 | 3/1976 | Thorp, II | 176/36 R |
| 4,019,954 | 4/1977 | Giordano et al. | 176/38 |
| 4,147,589 | 4/1979 | Roman et al. | 176/36 |
| 4,158,602 | 6/1979 | Minnick | 176/36 |
| 4,173,511 | 11/1979 | Dietrich et al. | 176/36 |
| 4,439,054 | 3/1984 | Veronesi | 403/322 |
| 4,550,941 | 11/1985 | Veronesi et al. | 294/86.4 |
| 4,752,433 | 6/1988 | Altman et al. | 376/230 |
| 4,863,673 | 9/1989 | Carruth | 376/230 |

Primary Examiner—Stephen J. Lechert, Jr.
Assistant Examiner—Nina Bhat

[57] ABSTRACT

A hydraulic lock for latching a displacer rod drive mechanism in an up position. A piston having a truncated cone-shaped valve element is formed at an end of the drive rod. A complementary truncated cone-shaped valve seat is formed in the cap of the reactor housing. When the drive rod is activated to the up position, the valve element seats against the valve seat creating a seal and a pressure boundary. The piston is provided with piston rings. The pressure differential acting across the piston is transferred to the area of contact between the valve element and valve seat thus maintaining the drive rod in the up position and preventing leakage flow from around the piston rings. A hydraulic control system for operating the hydraulic latch is also disclosed.

8 Claims, 4 Drawing Sheets

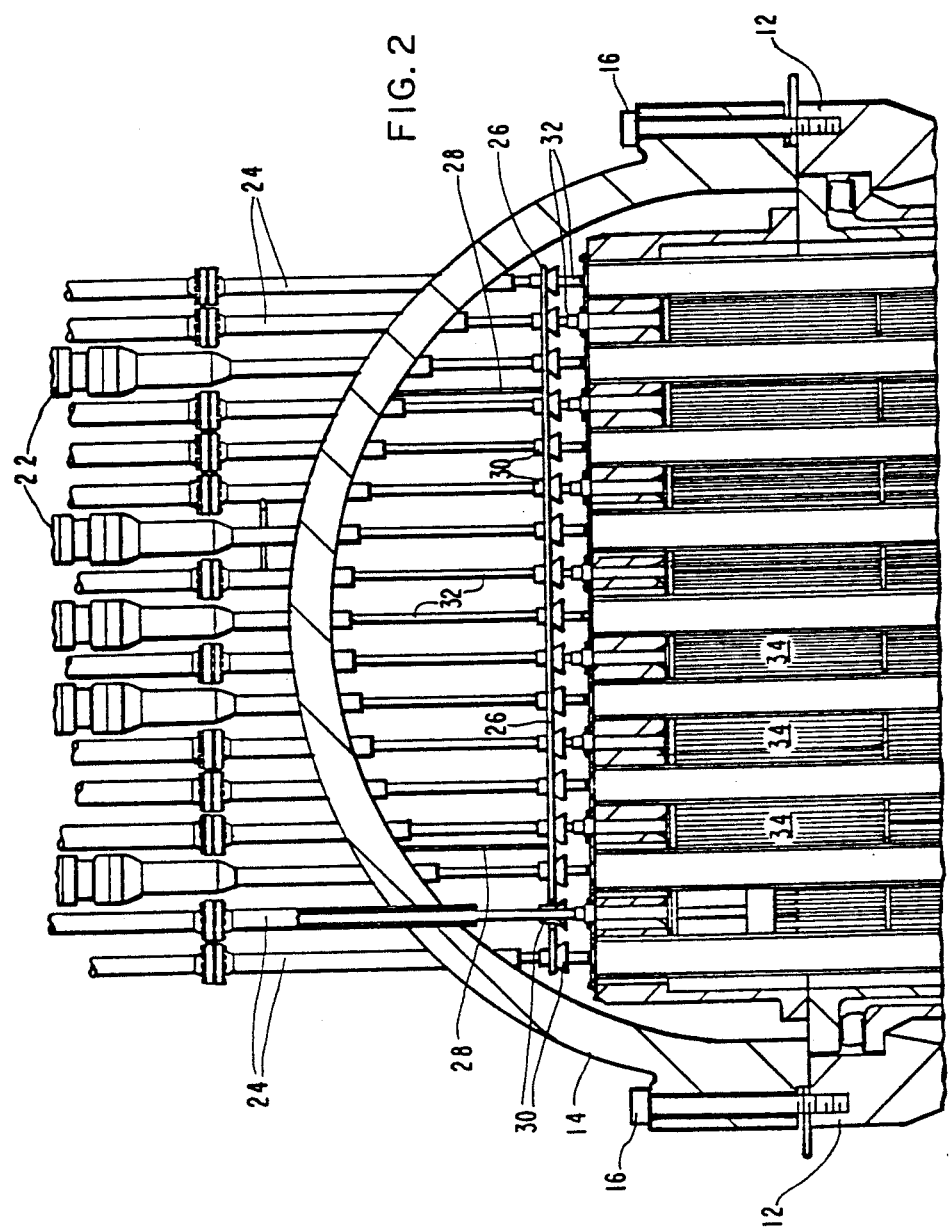

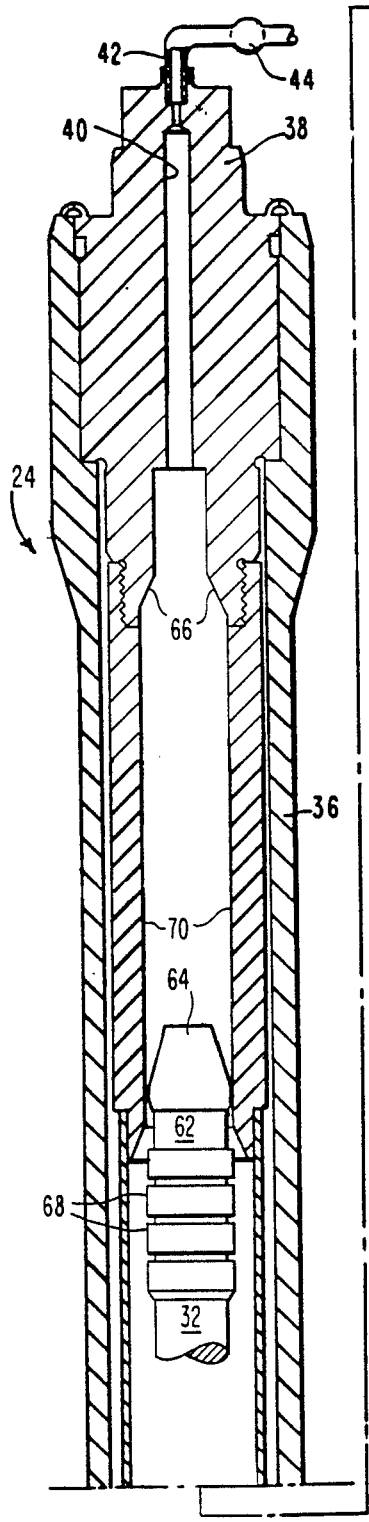
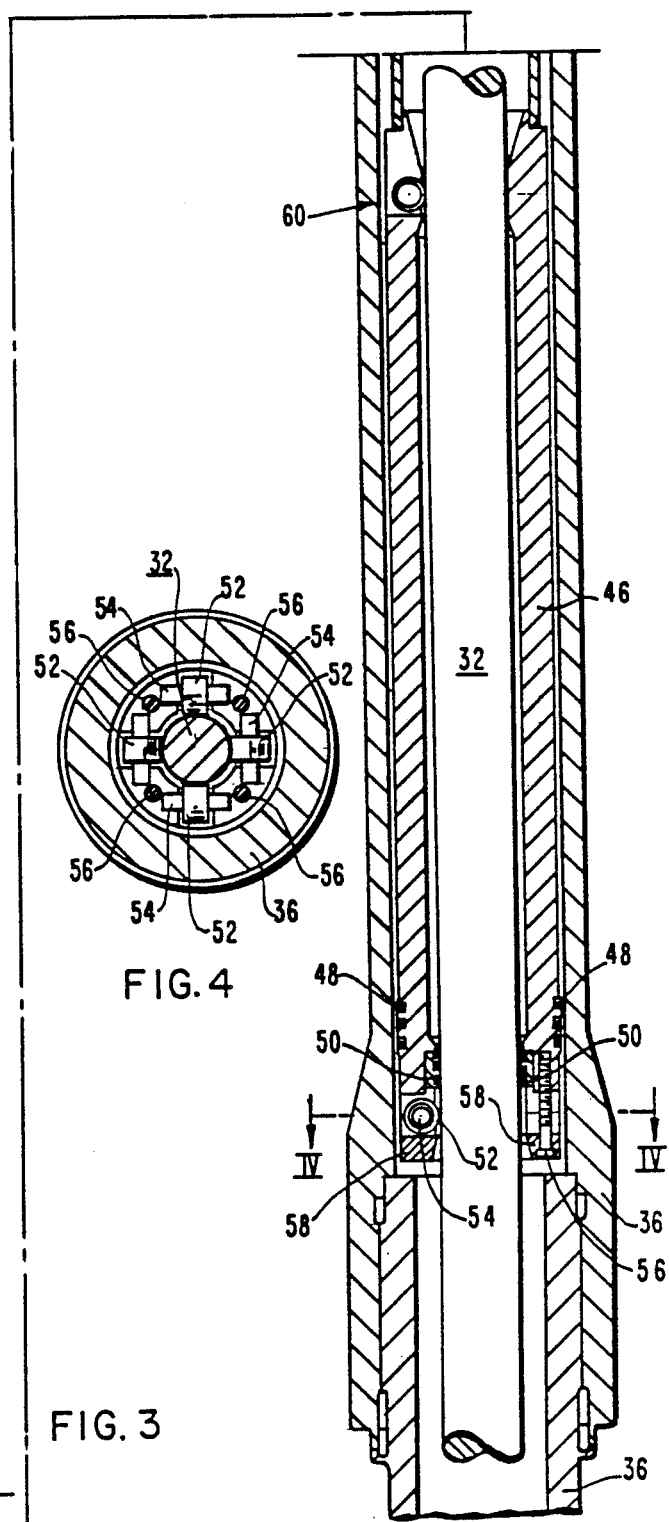
FIG. 4
FIG. 3

HYDRAULIC LOCK FOR DISPLACER ROD DRIVE MECHANISM (DRDM) AND METHOD OF OPERATION

BACKGROUND OF THE INVENTION

1. Field of the Invention

The present invention relates to a hydraulic lock for a displacer rod drive mechanism (DRDM) and more particularly to an up position hydraulic lock for DRDM of a pressurized water reactor (PWR).

2. State of the Relevant Art

As is well known in the art, conventional PRW's employ a number of control rods which are mounted within the reactor vessel, generally in parallel axial relationship, for axial translational movement in telescoping relationship with the fuel rod assemblies. The control rods contain materials known as poisons, which absorb neutrons and thereby lower the neutron flux level within the core. Adjusting the positions of the control rods relative to the respectively associated fuel rod assemblies thereby controls and regulates the reactivity and correspondingly the power output level of the reactor.

In certain advanced design PWR's, there are employed both reactor control rod clusters (RCC's) and water displacer rod clusters (WDRC's). WDRC's function as a mechanical moderator control, all of the WDRC's being fully inserted into association with the fuel rod assemblies, and thus into the reactor core, when initiating a new fuel cycle. Typically, a fuel cycle is of approximately 18 months, following which the fuel must be replaced. As the excess reactivity level diminishes over the cycle, the WDRC's are progressively, usually in groups, withdrawn from the core so as to enable the reactor to maintain the same reactivity level, even though the reactivity level of the fuel rod assemblies is reducing due to dissipation over time. Conversely, the RCC's are moved, again in axial translation and thus in a telescoping relationship relative to the respectively associated fuel rod assemblies, for control of the reactivity and correspondingly the power output level of the reactor on a continuing basis, for example in response to load demands, in a manner analogous to conventional reactor control operations.

The DRDM and RCC adjustment mechanisms have corresponding control shafts, or drive rods, which extend through the respective head extensions, flow shrouds, and calandria tubes and are connected to the respectively associated spiders mounting the clusters of RCC rods and WDRC rods, and serve to adjust their elevational positions within the inner barrel assembly and, correspondingly, the level to which the rods are lowered into the lower barrel assembly and thus into association with the fuel rod assemblies therein, thereby to control the activity within the core.

As alluded to above, after a period of operation of a nuclear reactor, it is necessary to be able to access and replace the spent fuel assemblies with fresh fuel assemblies. During this operation, it is necessary to remove the reactor vessel closure head. Since the RCC's and WDRC's are attached to their respective drive mechanisms which are mounted on the reactor vessel closure head, it is expedient to disconnect the RCC's and WDRC's from their corresponding drive mechanisms before removing the reactor vessel closure head while maintaining the RCC's and WDRC's in the nuclear reactor core.

The ability of leaving the RCC's and WDRC's in the nuclear reactor core during refueling may be achieved by providing a disconnect mechanism between the various control and displacer rods and the rod drive mechanisms. One such disconnect mechanism is disclosed by Roman et al. in U.S. Pat. No. 4,147,589, commonly assigned herewith. In Roman et al., there is described a control rod assembly for a nuclear reactor having a remotely disengageable coupling between the control rod and the control rod drive shaft. The coupling is actuated by first lowering then raising the drive shaft. The described motion causes axial repositioning of a pin in a grooved rotatable cylinder, each being attached to different parts of the drive shaft which are axially movable relative to each other.

Other hydraulic drive mechanisms with a latching feature are described by Veronesi in U.S. Pat. No. 4,439,054 and Veronesi et al. in U.S. Pat. No. 4,550,941, both commonly assigned herewith. The former uses a drive mechanism and the latter pressurized reactor coolant to raise a flexible spear past a pivoting latching mechanism. The latches use a biasing mechanism and pressure equalization respectively to permit the drive rod to move downwardly into contact with the pivoting latching mechanism. While Roman et al., Veronesi and Veronesi et al. describe mechanisms for disconnecting a drive mechanism from a reactivity control mechanism in a nuclear reactor, there remains a need for an alternative and simpler mechanism for effecting such a disconnection.

SUMMARY OF INVENTION

It is therefore an object of the invention to provide locking machanism for a DRDM which is reliable in operation and mechanically simple and sturdy. It is a further object of the invention to provide a simple, alternative latching mechanism which eliminates the need for displaceable, pivoting members, deflection spears and the like.

These, as well as other objects and advantages of the present invention are realized by providing a rod latch for a presurized nuclear reactor having a rod disposed in a rod housing having one end thereof selectively exposed to a relatively low pressure zone of the reactor and another end in communication with a relatively high pressure zone of the reactor. The rod has disposed at one end a valve member and the rod housing has disposed therein a corresponding valve seat. A control valve is provided for selectively establishing communication between the rod housing and the low pressure zone of the reactor whereby a pressure differential is created across a piston disposed on said rod adjacent the valve member sufficient to seat the valve member against the valve seat.

Preferable, the valve member is in the form of a truncated, cone-shaped element and the valve seat is in the form of a generally complementary shaped, truncated, inverted cone whereby the valve member and valve seat sealingly engage along a line of contact to establish a pressure boundry.

A method of operation is also disclosed.

BRIEF DESCRIPTION OF THE DRAWINGS

The invention will become more readily apparent from the following description of a preferred embodiment thereof shown, by way of example, in the accompanying drawings wherein:

FIG. 2 is a partial cross-sectional view in elevation of the nuclear reactor of FIG. 1.;

FIG. 3 is a partial cross-sectional view, in elevation, of the drive mechanism of the reactor of FIG. 2, showing the DRDM hydraulic lock in the down position;

FIG. 4 is a view along lines 4—4 of FIG. 3;

DESCRIPTION OF THE PRESENTLY PREFERRED EMBODIMENT

During the refueling of nuclear reactors, it is advantageous to disconnect the various rod drive mechanisms from the drive rods when the reactor vessel closure head is removed for refueling. In order to accomplish this, it is necessary to have a disconnect mechanism between the rod drive mechanisms and the drive rods. The invention described herein is a device for removing and inserting reactivity control rods in a nuclear reactor while allowing the drive rods to be disconnected from the drive mechanism during the refueling process.

Figure 1:
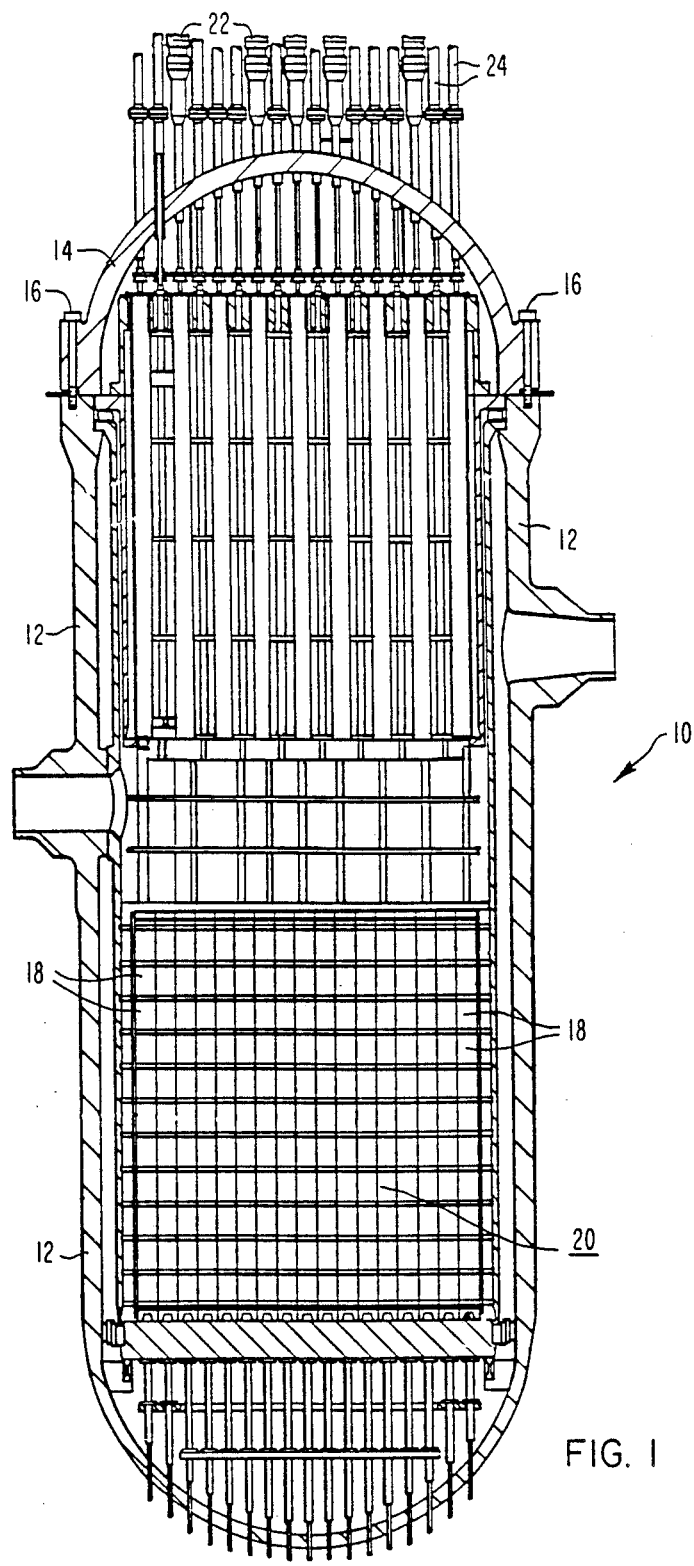
FIG. 1 is a partial, cross-sectional view, in elevation, of a nuclear reactor.

Referring to FIGS. 1 and 2, the nuclear reactor is referred to generally as 10 and comprises a reactor vessel 12 having a removable closure head 14 attached to the top thereof by means of bolts 16. A plurality of fuel assemblies 18 are disposed within reactor vessel 12 and comprise reactor core 20. A plurality of control rod drive mechanisms (CRDM's) 22 which may be of the type generally known in the art are mounted on and extend through the closure head 14 for inserting and removing control rods (not shown) from the fuel assemblies 18 as is well understood in the art.

Still referring to FIGS. 1 and 2, a plurality of DRDM's 24 are also attached to and extend through closure head 14. A plate 26 is suspended from the inside of closure head 14 by supports 28. A multiplicity of funnel-shaped guide members 30 are attached to plate 26 and are arranged in line with each of the CRDM's 22 and DRDM's 24. Each guide member 30 has a hole therethrough that allows a drive rod 32 to be slideably disposed therein. Each drive rod 32 is either attached at its lower end to a cluster of displacer rods 34 and capable of being attached at its upper end to a DRDM or attached at its lower end to a cluster of control rods (not shown) and at its upper end to a CRDM 22. The arrangement of control rods and displacer rods may be such as that described in commonly assigned U.S. Pat. No. 4,710,340 entitled "Mechanical Spectral Shift Reactor". Each drive rod 32, whether attached to a control rod drive mechanism 22 or a displacer rod drive mechanism 24, is capable of being disengaged from either its respective DRDM 24 or CRDM 22 so that closure head 14 may be removed carrying with it the CRDM 22, DRDM 24 and plate 26 with guide members 30 attached thereto. Closure head 14 may be removed during the refueling process to replace spent fuel assemblies 18 with fresh ones. The disconnectability of drive rod 32 from its respective drive mechanism enables this to be easily accomplished. When it is time to replace closure head 14, guide members 30 aid in aligning each drive rod 32 with its respective drive mechanism so that when closure head 14 is placed on reactor vessel 12, each drive rod 32 slides through its respective guide member 30 and into its respective drive mechanism.

Referring now to FIG. 3, there is illustrated a DRDM 24 which comprises a substantially cylindrical metal housing 36 which is welded to and extends through closure head 14. The housing 36 has a cap 38 attached to the top thereof which has a channel 40 therethrough that is connected to a conduit 42. The conduit 42 is connected to the cap 38 and to a tank (not shown) and has a flow regulating valve 44 displaced therein. Since the interior of the housing 36 is exposed to the interior of reactor vessel 12, the reactor coolant fills the void spaced within housing 36 and, if not otherwise sealed from communication with the channel 40, flows through the conduit 42 when the valve 44 is open.

A bearing housing 46 is removably disposed within the housing 36 and has a plurality of first piston rings 48 attached to the outside thereof near its lower end which extend into contact with the inside of the housing 36 for aligning the bearing housing 46 within the housing 36 but allowing for the removal of the bearing housing 46. The drive rod 32 is slideably disposed within the bearing housing 46 in a manner so as to be able to be moved axially with respect to the bearing housing 46 and the housing 36 under the influence of the reactor coolant pressure. A plurality of second piston rings 50, which may be made of Inconel, are removably disposed within the bearing housing 46 so as to be able to contact drive rod 32. A second piston ring or rings 50 provide a mechanism for allowing the drive rod 32 to slide within the bearing housing 46 while limiting the flow of reactor coolant through the bearing housing 46 and the housing 36 when the valve 44 is open. In this manner, the movement of drive rod 32 can be controlled by opening and closing the valve 44. The second piston rings 50 are arranged so that they may be replaced when the bearing housing 46 is removed from the housing 36.

Referring now to FIGS. 3 and 4, a plurality of roller bearings 52 are disposed on a like number of axles 54 in a manner so as to allow the outer surface of roller bearings 52 to contact the outer surface of the drive rod 32 while allowing the rotation of the roller bearings 52. As shown in FIG. 4, four roller bearings 52 may be used so as to align a drive rod 32 within bearings housing 46 while aiding in the movement of the drive rod 32. A plurality of screws 56, corresponding to the number of roller bearings 52, are used to attach a holding member 58 to bearing housing 46 so as to hold the roller bearings 52 within the bearing housing 46 yet allow replacement thereof by removal of screws 56 and holding member 58. In a like manner, a second set of roller bearings 60 are disposed at the other end of bearing housing 46 to provide alignment of drive rod 32.

Figure 5:
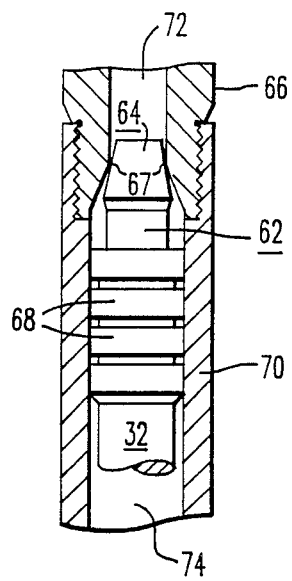
FIG. 5 is a partial cross-sectional view, in elevation, of the hydraulic latching piston for the DRDM of FIG. 3 in the up-position.

Referring now to FIGS. 3 and 5, the upper end of the drive rod 32 is formed into a piston 62 which travels within a cylinder 70 formed in the upper end of the bearing housing 46. The piston 62 carries a valve member 64, preferably having a truncated, cone-shaped end which seats against a generally complementary truncated cone-shaped valve seat 66 formed in the cap 38. As will be apparent to the artisan, valve and valve seat geometries other than complementary cone-shaped members can also be used although the contours of the valve seat 66 and valve member 64 should provide for a sealing contact along a line of contact therebetween to thereby create a pressure boundary. The valve member 64 is preferably hardened to resist wear and for effective seating with the valve seat. One or more piston rings 68 are positioned along the piston 62 to slidingly contact the interior surface of the cylinder 70.

In operation, the piston 62 on the drive rod 32 and the valve seat 66 of the cap 38 cooperate to form a hydraulic valve. When it is desired to lock the drive rod 32 in the up position, illustrated in FIG. 5, the piston cone 64 seats against the valve seat 66 forming a pressure boundary seal. Thus, when it is desired to latch the drive rod in the up position, the region 72 is exposed, via a central valve disclosed below, to a significantly lower pressure than the region 74; the pressure differential thus formed acts across the piston rings 68 and is transferred to the area of seating between the valve member, piston cone 64 and valve seat 66. This pressure differential holds the drive rod 32 in the up position of FIG. 5 and, assuming essentially perfect valve seating, there will be no flow around the piston rings 68. In essence, the piston cone 64 becomes a pressure boundary seal while the drive rod 32 is in its up position. Thus, the invention achieves an effective up position hydraulic lock for a DRDM while eliminating the flexible spear/rotating latch concepts of Veronesi and Veronesi et al.

Figure 6:
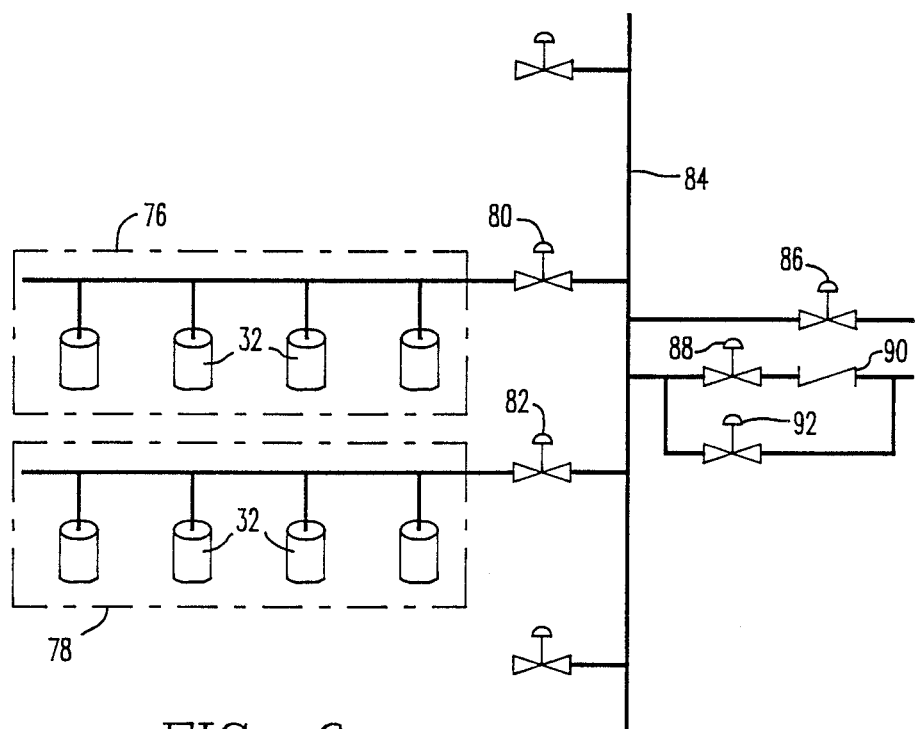
FIG. 6 is a simplified diagram of a DRDM vent system illustrating the operation of the hydraulic up-latch of FIGS. 3 and 5.

Referring now to FIG. 6, there is a simplified illustration of a vent system for a DRDM in accordance with the present invention. For a more complete understanding of the vent system reference should be had to commonly assigned, copending Altman et al., Ser. No. 806,719, filed on Dec. 9, 1985 and entitled "Vent System for Displacer Rod Drive Mechanism of Pressurized Water Reactor and Method of Operation", the disclosure of which is hereby incorporated by reference. In FIG. 6, the numeral 76 represents a first group and the numeral 78 a second group of WDRC's. As will be understood by the artisan, more than two parallel groups of WDRC's can be controlled using a single vent system. In the illustrated embodiment, solenoid valves 80 and 82 connect the WDRC groups 76 and 78 respectively to a manifold 84. A head vent valve 86 connects the manifold 84 to the reactor vessel head. A control valve 88 connects the manifold 84 to a holding or processing tank (not illustrated) through a manifold restrictor 90. A by-pass valve 92 is positioned in parallel with the control valve 88 and manifold restrictor 90.

In operation, in order to raise a bank of drive rods 32, the head vent valve 86 is closed and the control valve 88 is opened. The solenoid valve 80 or 82 corresponding to the bank of drive rods to be raised is then opened, thereby establishing the requisite pressure differential across the piston 62 to raise the drive rods 32. It should be understood that as desired, the valve 44 can be manipulated to insert or remove a particular drive rod 32 from a bank 76, 78 of drive rods.

Thereafter, to reinsert the drive rods, the control valve 88 is closed and the head vent valve 86 opened, thereby removing the pressure differential across the piston 64, which locks the drive rod in the up position.

Thus, the invention provides an improved DRDM latch mechanism of enhanced reliability and reduced operating complexity by eliminating the flexible spear and latch arrangement of the prior art.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, any convenient source of low or high pressure can be used to create the required pressure differential across the drive rod piston. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A drive rod latch for use in a nuclear reactor having a first, relatively low pressure zone and a second, relatively high pressure zone, said drive rod latch comprising a drive rod disposed in a rod housing, said rod having one end adapted to be selectively exposed to said first, relatively low pressure zone of the reactor and another end thereof adapted to communicate with said second, relatively high pressure zone of the reactor, said drive rod further having disposed on an end thereof a valve member and said rod housing having disposed thereon a corresponding valve seat, and a control valve for selectively establishing communication between the housing and the first zone of the reactor whereby a pressure differential is created across the piston, said pressure differential being sufficient to seat the valve member against the valve seat to thereby establish a pressure boundry.

2. The drive rod latch of claim 1 wherein said valve member is in the form of a truncated, cone-shaped element and the valve seat is in the form of a generally complementary shaped truncated inverted cone whereby said valve member and valve seat sealingly engage along a line of contact.

3. The drive rod latch of claim 2 wherein said valve member is carried on a piston formed as an end of said drive rod, said piston being disposed in a cylinder formed in said rod housing, said piston having a piston ring for sealingly contacting the cylinder and for transferring a closing force created by said pressure differential to said line of contact.

4. The drive rod latch of claim 1 wherein said control valve is disposed between the first zone of the reactor and said valve member.

5. The drive rod latch of claim 4 further comprising a vent valve disposed between the second zone of said reactor and said valve member.

6. The reactor of claim 5 further comprising a plurality of drive rods arranged in rod groups, the drive rods of each of said rod groups being in fluid communication with each other, and a manifold arranged to selectively connect said rod groups to said vent valve and said control valve and further comprising an additional valve for controlling communication between said rod groups and said manifold.

7. A method of latching a drive rod disposed in a nuclear reactor having a first, relatively high pressure zone and a second relatively low pressure zone, said drive rod having a valve member disposed at an end thereof for cooperating with a valve seat, said valve member having a first side in communication with the first zone of said reactor, and a second side, selectively operable to be placed in communication with either said first zone or said second zone comprising the steps of:
   isolating a second side of said valve member from said first zone;
   establishing fluid communication between said second side of said valve member and said second zone whereby a pressure differential is created across said valve member to seat said valve member against said valve seat to thereby latch said drive rod.

8. A drive rod latch in combination with a nuclear reactor having a drive rod disposed in a rod housing characterized in that the drive rod has one end selectively exposed to a first, relatively low pressure zone of the reactor and another end thereof in communication with a second, relatively high pressure zone of the reactor, said drive rod further having disposed on an end thereof a valve member and said rod housing having disposed thereon a corresponding valve seat, and a control valve for selectively establishing communication between the housing and the first zone of the reactor whereby a pressure differential is created across the piston, said pressure differential being sufficient to seat the valve member against the valve seat to thereby establish a pressure boundry.

* * * * *